United States Patent
Schomaker

[11] 3,743,271
[45] July 3, 1973

[54] SOLDERING JIG

[76] Inventor: Henry C. Schomaker, 992 Wentworth Avenue, Calumet City, Ill. 60409

[22] Filed: May 5, 1971

[21] Appl. No.: 140,319

[52] U.S. Cl................. 269/37, 269/287, 269/296
[51] Int. Cl............................................ B25b 1/24
[58] Field of Search.................. 269/287, 296, 126, 269/37, 41, 134–136

[56] References Cited
UNITED STATES PATENTS
2,399,536  4/1946  Baum.............................. 269/41 X

*Primary Examiner*—Robert C. Riordon
*Assistant Examiner*—E. F. Desmond
*Attorney*—Petherbridge, O'Neill & Lindgren

[57] ABSTRACT

A jig for assembling and soldering connecting rods and linkage to a crankshaft especially useful for the repair and servicing of gas meters. The jig includes a holding block member adapted to receive a crankshaft and having a sliding lock plate for securing the crankshaft in a proper position for servicing. An adjustable stop is provided to insure the correct angular relationship of connecting linkage to be soldered to the crankshaft and the proper angular relationship is maintained by a suitable spring bias. The holding block is pivotally secured to a base plate such that it may be pivoted into a postion to facilitate the insertion and removal of work pieces placed therein.

8 Claims, 5 Drawing Figures

Patented July 3, 1973 3,743,271

INVENTOR
HENRY C. SCHOMAKER

BY Petherbridge, O'Neill & Lindgren

ATTORNEYS

Patented July 3, 1973 3,743,271
2 Sheets-Sheet 2
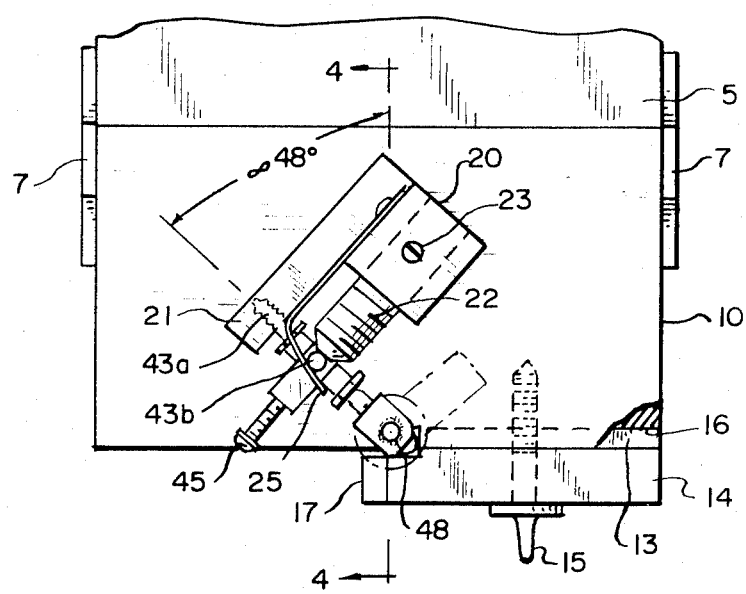
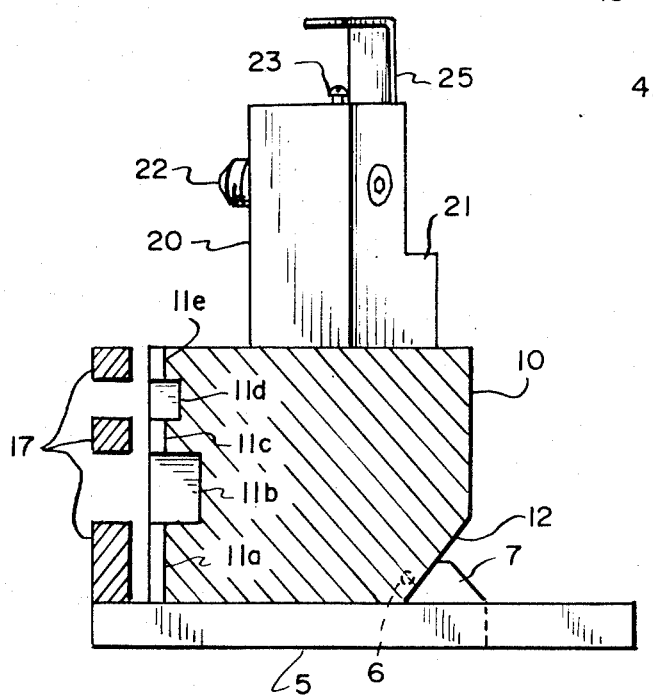
INVENTOR.
HENRY C. SCHOMAKER
BY Petherbridge, O'Neill &
Lindgren
ATTORNEYS.

SOLDERING JIG

BACKGROUND OF THE INVENTION

This invention relates in general to work holders, and in particular to a jig for assembling and soldering connecting linkage to a crankshaft. More specifically, this invention relates to an apparatus for retaining a crankshaft in a fixed position and aligning the connecting linkages in a predetermined angular relationship thereto for securing the connecting linkages to the crankshaft.

Although this invention can be utilized in many applications wherever it is desired to properly align and secure connecting linkages to a crankshaft, for convenience of illustration it will be described with reference to its use as a work holder or jig for repairing gas meters. However, it is not intended that this invention be limited to that particular preferred application.

In the metering of gas, particularly to residential consumers, a double chamber meter is employed having a diaphragm in each chamber. The movement of both diaphragms is coupled to a lever system which controls the alternate filling and emptying of each chamber. Since the volume of each chamber is known, as unmetered gas fills the chamber the diaphragms are moved to their outermost position indicating that the chamber is filled with gas. This filling of the chamber acuates a linkage system operatively connected to the diaphragms to move suitable slide valves for passing the gas from the meter to the consumer. In addition, the movement of the diaphragm linkage system actuates a suitable counter mechanism to indicate the quantity of gas passed through the meter.

Frequently, it becomes necessary for these gas meters to be removed from service for repair or metering accuracy checks. When the meters are disassembled, certain components such as the connecting linkage from the diaphragm to the sliding valves and/or counter mechanism are worn and must be replaced. Therefore, the connecting rods and linkage are removed from the meter crankshaft and replacement components are substituted. Thereafter, the proper relationship between the various elements of the linkage system must be re-established to ensure accurate metering of the flow rate through the meter.

However, in view of the varying sizes of the meters and the differences in construction due to fabrication techniques employed by the various original equipment manufacturers, problems are encountered in servicing and repairing these meters by the many public utility companies. In the past, each original equipment manufacturer has provided the utility companies with drawings relating to jigs for servicing the individual units manufactured by the company. However, these structures have been extremely cumbersome and do not have universal application. They are designed solely for use with the meter manufactured by an individual company. The instant invention has universal application for repairing and servicing all types of gas meters and is readily and easily set up for meter repair and service.

SUMMARY OF THE INVENTION

It is, therefore, an object of this invention to improve assembly and soldering jigs.

Another object of this invention is to service and repair diversely constructed gas meter mechanisms.

A further object of this invention is to quickly and simply set up the gas meter mechanism for soldering and securing connecting linkages to a crankshaft in a predetermined angular relationship.

These and other objects are attained in accordance with the present invention wherein there is provided a jig for assembling and soldering connecting rods and linkages to a crankshaft, the jig including a holding block having recesses to receive a crankshaft secured in a proper position for assembling and properly positioning the connecting linkage to inusre the correct angular relationship between the various components of the metering mechanism.

DESCRIPTION OF THE DRAWINGS

Further objects of this invention, together with additional features contributing thereto and advantages accrueing therefrom, will be apparent from the following description of one embodiment of the invention when read in conjunction with the accompanying drawings, wherein:

FIG. 3 is a horizontal plan view of the invention holding a work piece;

FIG. 4 is a partial sectional view of FIG. 2 taken along line 4—4 to better illustrate the holding block recesses;

FIG. 5 is a perspective view of a serviced work piece assembled for installation in a gas meter.

DESCRIPTION OF THE PREFERRED EMBODIMENT

Figure 1:
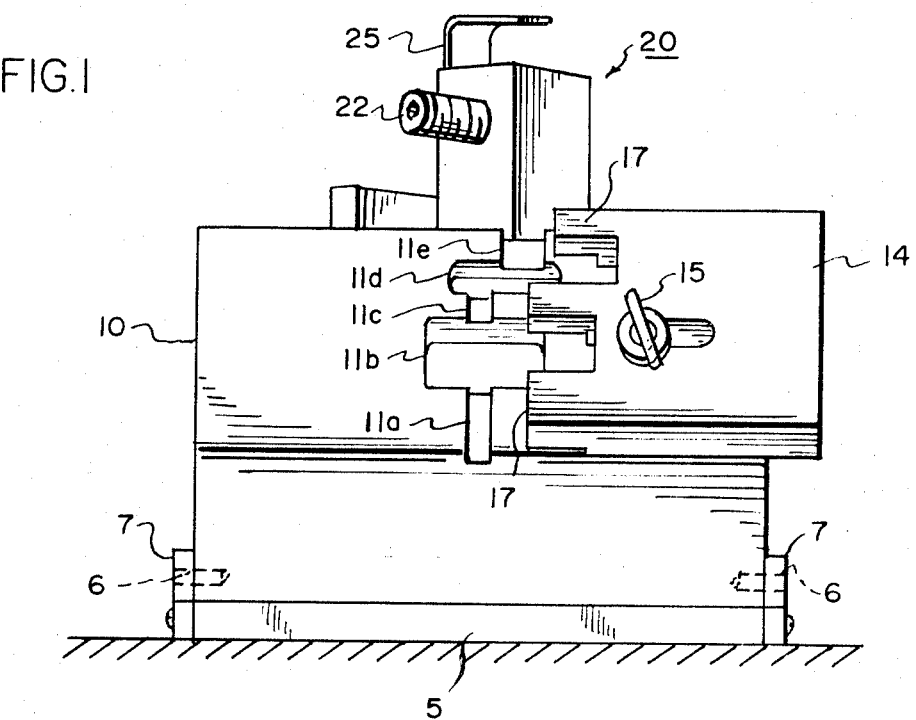
FIG. 1 is a frontal view of the subject invention pivoted into a position for receiving a work piece.

Referring now to FIG. 1, there is shown an assembly and soldering jig including a holding block 10 having a plurality of recesses 11a, 11b, 11c, 11d and 11e. The recesses are each formed of a size suitable to accommodate the various portions of a crankshaft used in metering the flow of gas through a g as meter. A sliding lock plate 14 is carried on the holding block for sliding movement forming a closure over recesses 11a, 11c and 11e thereby holding a work piece, such as a crankshaft 40, to the holding block. The sliding lock plate 14 is formed with a complementary extending portion 16 extending into a groove 13 formed in the holding block surface to constrain the sliding movement of the lock plate lateral to the recesses formed in the holding block. A thumb screw 15 passes through a slot formed in the lock plate and is threaded into the holding block 10 to secure the lock plate in a fixed position. The portions 17 of the lock plate 14 which extend over the recesses 11a, 11c and 11e are undercut to accommodate varying thicknesses of the portions of a crankshaft placed in the recesses 11- e of the holding block.

The holding block 10 is pivotally secured to a base plate 5 by means of hinge pins 6 secured in a pair of brackets 7 carried by the base plate. In this manner, the holding block 10 is pivotable about the hinge pins 6 relative to the base plate to allow the holding block to be positioned as shown in FIG. 1 for placing and removing the work pieces in the holding block. As best shown in FIG. 4, a portion of the holding block is undercut (12) to allow the holding block to be pivoted upwardly and maintain a stable position for the placing and removal of the work piece.

Figure 2:
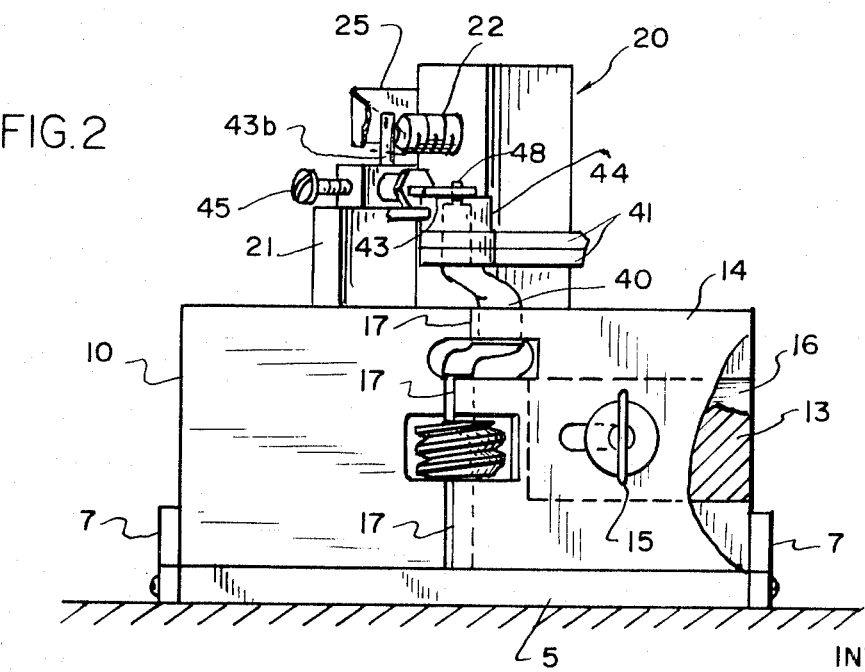
FIG. 2 is a vertical frontal plan view of the invention with a work piece positioned therein and having portions broken away to better illustrate the angular positioning structure.

As best shown in FIGS. 2 and 3 a stop block 20 is secured to the upper face of the holding block 10 extending upwardly therefrom to provide an adjustable stop for maintaining a predetermined angular relationship between a crankshaft 40 placed in the recesses 11a – e of the holding block and the connecting linkage 43 which is to be soldered to the crankshaft. The stop block 20 extends vertically upward from the holding block surface and carries an adjustable screw 22 threaded therein. The adjustable screw 22 extends outward from the stop block 20 an amount predetermined to define an angular relationship (preferably about 48°) between the connecting linkage 43 and a vertical plane passing through the crankshaft 40 as best shown in FIG. 3. When this predetermined angular relationship has been set, a lock screw 23 secures the adjustable screw 22 in place insuring that the correct position is maintained. A shoulder stop 21 is formed by an extension of the stop block 20 for supporting a portion (43a) of the connecting linkage during the assembly and soldering operation.

A spring 25 pivotally secured to the stop block 20 is used to bias a portion 43b of the connecting linkage 43 against the end of adjustable screw 22 to insure that no relative movement occurs therebetween during the assembling and soldering operation.

To better illustrate the features and advantages of the adjustable assembly and soldering jig, its functional operation in assembling and servicing a work piece is described below. Initially, the mig jig is placed in the position shown in FIG. 1 with the holding block 10 pivoted back onto base plate 5 by means of the hinge pins 6 with the holding block resting on its undercut portion 12. The sliding block plate 14 is slid to a position whereat the extending portions 17 are not in interference with any of the recesses 11– e. A crankshaft 40 is placed into the recesses 11a – e which are of a sufficient depth (FIG. 4) to accommodate any of the commercially available crankshafts used in public utility gas meters. It should be noted that the recesses 11a – e are formed such that there is only a single position in which a crankshaft can be placed into the holding block recesses.

The sliding lock plate 14 is then slid back with the extending portions 17 closing the recesses 11a, 11c and 11e thereby securing the crankshaft 40 within the recesses (FIGS. 2 and 3). The thumb screw 15 is tightened preventing the lock plate from moving out from this position. A pair of connecting rods 41 are placed over the crankshaft to be positioned thereon for coupling to the diaphragm of a double diaphragm gas meter, and a bracket 44 is placed onto the crankshaft for securing the crankshaft assembly in a proper position once it is replaced into the meter. The connecting linkage 43, having a pair of adjusting screws 45 which function to vary certain parameters within the meter are placed over the end of the crankshaft 40 and against the adjusting screw 22. A portion 43a of the connecting linkage rests on the shoulder stop 21 of the stop block 20. The spring 25 is positioned to engage a portion 43b of the connecting linkage to bias the linkage against the end of the adjusting screw 22. In this manner the angular relationship between the connecting linkage 43 and the crankshaft 40 is fixed and the apparatus is ready to be soldered. The holding block 10 is then pivoted back to its original horizontal position and solder is applied to the juncture 48 of the connecting linkage and the crankshaft to secure one to the other. The thumb screw 15 is then loosened and the sliding lock plate 14 moved back out of interference with the recesses and the completed assembly removed from the fixture (FIG. 5).

While the invention has been described with reference to a preferred embodiment, it will be understood by those skilled in the art that various changes may be made and equivalents may be substituted for elements thereof without departing from the scope of the invention. In addition, many modifications may be made to adapte a particular situation or material to the invention without departing from its essential teachings. Therefore, it is intended that the invention not be limited to the particular embodiment disclosed as the best mode contemplated for carrying out this invention, but that the invention will include all embodiments falling within the scope of the appended claims.

What is claimed is:

1. A jig for assembling a work piece comprising
holding means having a recess formed therein for receiving a first work piece element including an undercut portion for maintaining said holding means in a stable position when pivoted relative to said base plate, said holding means being pivotally secured to said base plate for rotational movement relative thereto,
retaining means carried by said holding means and movable relative thereto for closing at least a portion of said recess,
stop means carried by said holding means adajcent said recess for positioning a second work piece element in angular relationship to a first work piece element positionable in said recess.

2. The apparatus of claim 1 wherein said stop means for positioning a second work piece element in angular relationship to a first work piece element positionable in said recess comprises a vertical member extending from said holding means and carrying a threaded member movable transversely thereof.

3. A jig for assembling a work piece comprising
holding means having a recess formed therein for receiving a first work piece element,
retaining means carried by said holding means and movable relative thereto for closing at least a portion of said recess,
stop means carried by said holding means adjacent said recess for positioning a second work piece element in angular relationship to a first work piece element positionable in said recess comprising a vertical member extending from said holding means and carrying a threaded member movable transversely thereof, and
means for locking said threaded member to prevent movement thereof transverse of said vertical member.

4. A jig for assemblying a work piece comprising
holding means having a recess formed therein for receiving a first work piece element,
retaining means carried by said holding means and movable relative thereto for closing at least a portion of said recess,
stop means carried by said holding means adjacent said recess for positioning a second work piece element in angular relationship to a first work piece element positionable in said recess comprising a vertical member extending from said holding means and carrying a threaded member movable transversely thereof, and bias means for holding a second work piece element against said threaded member.

5. The apparatus of claim 4 wherein said stop means is formed with a depending extension extending outwardly therefrom substantially parallel to said threaded member for supporting a portion of a second work piece element.

6. The apparatus of claim 1 wherein said retaining means carried by said holding means and movable relative thereto for closing at least a portion of said recess comprises a locking plate having a plurality of extending portions formed therein to contact a first work piece element positionable in said recess.

7. The apparatus of claim 6 wherein said holding means is formed with a guide slot therein, and said retaining means is formed with an extending portion engageable in said slot formed in said holding means for guiding the movement of said retaining means in a direction parallel to said holding means and transverse of said recess.

8. The apparatus of claim 6 wherein each of said plurality of extending portions is undercut to engage a portion of a first work piece positionable in said recess.

stop means carried by said holding means adjacent said recess for positioning a second work piece element in angular relationship to a first work piece element positionable in said recess comprising a vertical member extending from said holding means and carrying a threaded member movable transversely thereof, and bias means for holding a second work piece element against said hreaded member.

* * * * *

UNITED STATES PATENT OFFICE
CERTIFICATE OF CORRECTION

Patent No. 3,743,271　　　　　　　　　　Dated July 3, 1973

Inventor(s)　　Henry C. Schomaker

It is certified that error appears in the above-identified patent and that said Letters Patent are hereby corrected as shown below:

Column 2, line 11, "inusre" should read -- insure --; line 43, "g as" should read -- gas --; line 59, "11-e" should read -- 11a-e --. Column 3, line 32, "mig jig" should read -- jig --; line 36, "14is" should read -- 14 is --; line 38, "11-e" should read -- 11a-e --. Column 4, line 13, "adapte" should read -- adapt --. Claim 8 beginning with line 9, "stop means" cancel to and including "hreaded member." in line 17.

Signed and sealed this 8th day of January 1974.

(SEAL)
Attest:

EDWARD M. FLETCHER, JR.　　　　　RENE D. TEGTMEYER
Attesting Officer　　　　　　　　Acting Commissioner of Patents